Patented May 14, 1940

2,200,710

UNITED STATES PATENT OFFICE 2,200,710

METHOD OF SEALING OFF WATER BEARING FORMATIONS

Franklin A. Bent, Albert G. Loomis, and Howard C. Lawton, Berkeley, Calif., assignors to Shell Development Company, San Francisco, Calif., a corporation of Delaware No Drawing. Application February 19, 1938, Serial No. 191,402

11 Claims. (Cl. 61—36)

This invention pertains to a chemical method for plugging or sealing off water bearing formations and is particularly suited for the treatment of gas and oil wells.

In cases where it is difficult or impossible to cement off water layers traversed by a well without at the same time interfering with the flow of oil, chemical methods are commonly used to prevent water from entering the well. For this purpose, a treating solution is introduced into the well, forced into the layer to be sealed off, and caused to deposit a sealing precipitate in the pores of said layer by reaction with a second solution introduced thereinto, or with certain salts naturally present in the formation waters.

In cases where it is desired to effect a selective shut-off of a water layer closely adjacent oil bearing sands, a method involving the use of two treating solutions should be avoided, since a portion of the treating liquids will often penetrate into the oil layer and form by inter-reaction an undesirable precipitate within the latter. In such cases, therefore, a method involving the use of a single chemical capable of forming a precipitate by reaction with the natural formation waters should be preferred.

In practice, however, such methods meet with considerable difficulties, since the bulk of the compounds dissolved in natural oil-field waters or brines consist of sodium chloride, which does not readily form precipitates. The precipitatable compounds of formation waters are therefore chiefly limited to calcium and magnesium salts, which usually occur only in low concentrations. Since the effectiveness of a water shut-off depends largely on the amount and the nature of the precipitate formed within the pores of the formation, such methods very often give unsatisfactory results.

It is, therefore, the object of this invention to provide a method for treating water formations by forcing thereinto a treating agent capable of reacting with the water-soluble alkali compounds, chiefly sodium chloride, commonly present in the ground waters, to give a water-insoluble alkali salt precipitate in amounts sufficient for effectively plugging or sealing off said formations.

It is a further object of this invention to provide a process whereby the nature of the precipitate formed, and the time necessary for its formation, may be controlled by means of an additional treatment in such a manner as to secure the placement of a particularly effective seal well back in the strata to be sealed off.

The method of the present invention consists in treating the water bearing layers with hydrofluosilicic, hydrofluotitanic, hydrofluozirconic and hydrofluoferric acids and with their water-soluble organic or inorganic salts. For example, metallic fluosilicates, that is, metallic salts of hydrofluosilicic acid are soluble in water with the exception of those of the alkali metals and of barium. Sodium, potassium and barium fluosilicates have solubilities of 0.65, 0.12, and 0.026 of 1% at 17.5°, respectively, and may be considered as water-insoluble for the purposes of this invention.

Likewise, certain organic salts of hydrofluosilicic acid, such as the amine salts, for example, aniline or dianiline hydrofluosilicate, toluidine hydrofluosilicate, xylidine hydrofluosilicate, phenylene-diamine hydrofluosilicate, methyl aniline hydrofluosilicate, diphenylamine hydrofluosilicate, dimethyl aniline hydrofluosilicate, etc., are sufficiently water-soluble to be applicable for the present process.

In applying the treatment of the present invention to an oil-well in order to seal off water-bearing formations, the following procedure may be followed:

The well is first preferably filled with oil, and a desired amount of an aqueous solution of a metallic fluosilicate, for example, the calcium, magnesium, lead, or iron salt of hydrofluosilicic acid, or a water-soluble organic salt, such as dianiline hydrofluosilicate, is then introduced into the well through the tubing or casing, and is forced into the formation by pumping down another charge of oil, water, or brine, or by applying pressure to the well in any other known manner. The treating solution will diffuse into the formation water or brine, forming by reaction with the alkali salts, chiefly sodium chloride, dissolved therein, a water-insoluble precipitate, chiefly sodium fluosilicate. This insoluble sodium salt is gelatinous in nature and separates slowly, which allows a deep penetration of the treating liquid into the formation and results in an effective plugging of the brine or water-bearing layer. Since only a relatively small portion of the treating solution has a tendency to penetrate into the oil layers, due to its immiscibility with oil, and since, moreover, no reaction takes place within said layers due to the absence therein of alkali ions in any significant concentrations, these strata are not affected by the treatment, and a preferential or selective shut-off of the water layers is effected.

The well can then be produced by releasing the pressure in order to flush out that portion of the treating solution which may have flowed into the oil horizons, and, if desired, a charge of a second treating solution, such as ammonium hydroxide, may be forced into the formation in the manner described above. A second reaction will take place with the sodium fluosilicate precipitated during the first treatment, with the formation of silicic acid and of ammonium fluoride, the latter reacting further with the calcium and magnesium ions of the brine, which may have been naturally present therein, or may have been added thereto in the form of magnesium or calcium fluosilicate during the first treatment. Instead of ammonium hydroxide, sodium or potassium hydroxides may equally well be used, care being taken to use slightly smaller quantities of these substances than the stoichiometric or theoretical quantities required to form silicic acid. If this condition is fulfilled, the formation of water-soluble alkali silicate is prevented, and the use of caustic alkalis, NaOH or KOH, will be as effective as the use of ammonium hydroxide, as shown by the following equations:

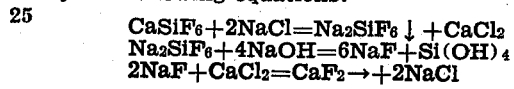

The final precipitate, consisting of a mixture of silicic acid and calcium fluoride forms an effective seal deep within the formation, since the reaction of the alkali hydroxide with sodium fluosilicate proceeds at a relatively slow rate and permits a deep penetration of the treating liquids into the ground strata, before the latter became sealed by the precipitate formed. In order to intensify this effect, and to delay still further the interaction between the two treating agents, it may sometimes be desirable to introduce into the well and to force into the formation a charge of a neutral material, such as oil or fresh water, between the charges of the water-soluble fluosilicate and of the caustic alkali.

Instead of the water-soluble fluosilicates, it is possible to treat briny formations directly with an aqueous solution of hydrofluosilicic acid, in which case the flow of the treating agent should preferably be directed toward said formations by means of packers or double-packers, in a manner known to the art. This treatment, when applied to formations saturated with brines of a high sodium chloride concentration, or when followed by a caustic alkali treatment, results in the formation of a plug of silicic acid, or of silicic acid and calcium fluoride as described before. Any mixture of hydrofluosilicic acid with one of its water-soluble metallic salts can likewise be used.

Although the process described above is especially suitable for sealing off brine or water-bearing formations, it can also be advantageously applied for plugging formations of any other type, for example gas-bearing formations, whereby excessive amounts of gases are prevented from entering a well. In such case, the charge of the hydrofluosilicic acid or of one of its water-soluble metallic salts is forced into a gas-bearing sand, and is followed or preceded by a charge of brine, or of any other salt solution, such as a water-soluble alkali silicate, for example, sodium silicate or metasilicate, potassium silicate or tetrasilicate, to form an insoluble alkali fluosilicate and a water-insoluble metallic silicate, as shown by the following equation:

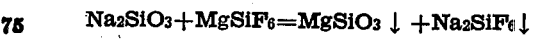

This treatment may be followed by a treatment with an alkali hydroxide, as shown before. In a similar way, the process of the present invention may be used for sealing off or decreasing the permeability of any desired ground formation. Thus, it may have a practical application in building canals, sluices, or dykes in porous soil, where it is desirable to stop the percolation of water through the sand, or in constructing landing piers, tunnels, etc., in ground formations which are not sufficiently impervious to fluid flow. The process is economically attractive in such cases because both the metallic fluosilicate and sodium chloride solutions are readily and cheaply available materials.

We claim as our invention:

1. In the process of decreasing the permeability of a porous formation, the steps of introducing into such formation a treating solution capable of liberating fluosilicic ions and reacting said solution within said formation with a water-soluble alkali salt, whereby a water-insoluble alkali fluosilicate is formed in the pores of said formation.

2. In the process of decreasing the permeability of a porous formation, the steps of introducing into said formation an aqueous solution of hydrofluosilicic acid and reacting said solution within said formation with a water-soluble alkali salt whereby a water-insoluble alkali fluosilicate is formed in the pores of said formation.

3. In the process of decreasing the permeability of a porous formation, the steps of introducing into said formation an aqueous solution of a water-soluble salt of hydrofluosilicic acid and reacting said solution within said formation with a water-soluble alkali salt whereby a water-insoluble alkali fluosilicate is formed in the pores of said formation.

4. In the process of decreasing the permeability of a porous formation, the steps of introducing into said formation an aqueous solution of a water-soluble metallic fluosilicate, and reacting said solution within said formation with a water-soluble alkali salt, whereby a water-insoluble alkali fluosilicate is formed in the pores of said formation.

5. In the process of decreasing the permeability of a porous formation, the steps of introducing into said formation an aqueous solution of a water-soluble organic salt of hydrofluosilicic acid, and reacting said solution within said formation with a water-soluble alkali salt, whereby a water-insoluble alkali fluosilicate is formed in the pores of said formation.

6. In the process of decreasing the permeability of a porous formation, the steps of introducing into said formation an aqueous solution of a water-soluble amine salt of hydrofluosilicic acid, and reacting said solution within said formation with a water-soluble alkali salt, whereby a water-insoluble fluosilicate is formed in the pores of said formation.

7. In the process of decreasing the permeability of a porous formation, the steps of introducing into said formation an aqueous solution of a water-soluble metallic fluosilicate, and reacting said solution within said formation with a water-soluble alkali silicate, whereby a water-insoluble alkali fluosilicate and a water-insoluble metallic silicate are formed in the pores of the formation.

8. In the process of sealing off brine-bearing formations traversed by a well, the steps of introducing into the well and forcing into said formation a treating solution comprising hydrofluosilicic acid, allowing said solution to form a water-insoluble alkali fluosilicate within said formation by reaction with the alkali salts dissolved in the formation brine, forcing into said formation a second treating solution comprising an alkali hydroxide, and allowing the second solution to react with the products of the first reaction to form a water-insoluble metallic fluoride.

9. In the process of sealing off brine-bearing formations traversed by a well, the steps of introducing into the well and forcing into said formation a treating solution comprising a water-soluble fluosilicate, allowing said solution to form a water-insoluble alkali fluosilicate within said formation by reaction with the alkali salts dissolved in the formation brine, forcing into said formation a second treating solution comprising an alkali hydroxide, and allowing the second solution to react with the products of the first reaction to form a water-insoluble metallic fluoride.

10. In a process for solidifying porous ground, the steps of introducing thereinto an aqueous solution of a water-soluble metallic fluosilicate and an aqueous solution of a water-soluble alkali salt, whereby a water insoluble alkali fluosilicate is formed in the pores of the ground by a reaction between said solutions.

11. In the process of decreasing the permeability of a porous formation, the steps of introducing into said formation an aqueous solution of a water-soluble metallic fluosilicate, and reacting said solution within said formation with a water-soluble sodium salt, whereby the water-insoluble sodium fluosilicate is formed in the pores of said formation.

FRANKLIN A. BENT.
ALBERT G. LOOMIS.
HOWARD C. LAWTON.